United States Patent
Kawamura et al.

(10) Patent No.: US 10,289,352 B2
(45) Date of Patent: May 14, 2019

(54) DEVICE, METHOD, AND PROGRAM FOR INSTRUCTING PRINTING BASED ON CONDITIONAL POST-PROCESSING

(71) Applicant: Konica Minolta, Inc., Chiyoda-ku, Tokyo (JP)

(72) Inventors: Yuji Kawamura, Toyokawa (JP); Masayuki Ito, Nagoya (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/984,908

(22) Filed: May 21, 2018

(65) Prior Publication Data

US 2018/0373471 A1    Dec. 27, 2018

(30) Foreign Application Priority Data

Jun. 22, 2017    (JP) ................................. 2017-122037

(51) Int. Cl.
*G06F 3/12* (2006.01)
*G06K 9/18* (2006.01)
*H04N 1/00* (2006.01)

(52) U.S. Cl.
CPC .......... *G06F 3/1205* (2013.01); *G06F 3/1206* (2013.01); *G06F 3/1207* (2013.01); *G06K 9/18* (2013.01); *H04N 1/00087* (2013.01); *H04N 1/00358* (2013.01)

(58) Field of Classification Search
None
See application file for complete search history.

(56) References Cited

U.S. PATENT DOCUMENTS

| 2013/0214470 A1* | 8/2013 | Yokomizo | B65H 37/04 270/1.01 |
| 2015/0350469 A1* | 12/2015 | Kanamoto | G03G 15/6544 358/1.15 |

FOREIGN PATENT DOCUMENTS

| JP | 2013-170066 | 2/2013 |
| JP | 2015-089845 | 11/2015 |
| JP | 2016-026971 | 2/2016 |

* cited by examiner

*Primary Examiner* — Andrew H Lam
(74) *Attorney, Agent, or Firm* — BakerHostetler

(57) ABSTRACT

A print instruction device that issues a print instruction with first connection processing or second connection processing to an image forming apparatus including a printer, and a post-processor capable of performing both the first connection processing and the second connection processing, after printing on a plurality of recording media by the printer, the print instruction device includes: a display; and a hardware processor that: determines whether the document to be printed of which the printed matter is to be connected by the post-processor falls under a preset condition to perform the second connection processing; and displays, on the display, display prompting setting the second connection processing as connection processing after or before print setting with the first connection processing is performed, when the document to be printed is determined to fall under the preset condition to perform the second connection processing by the hardware processor.

13 Claims, 10 Drawing Sheets

FIG. 9

| REGISTRATION TIME | REGISTRATION SOURCE | DOCUMENT NAME |
|---|---|---|
| 16:10 | e00001 | SCREEN SPECIFICATION |
| 11/23 | 12345678901 | 12345678901234567890 |
| 11/22 | 12345678901234567890 | 12345678901234567890 |
| 05/06 | 12345678901234567890 | 12345678901234567890 |
| 05/03 | 12345678901234567890 | 12345678901234567890 |
| 01/02 | 12345678901234567890 | 12345678901234567890 |
| 01/02 | 12345678901234567890 | 12345678901234567890 |
| 01/02 | 12345678901234567890 | 12345678901234567890 |

CONFIDENTIAL RECEPTION BOX

PRINTING IS STARTED WITH [PRINT EXECUTION] KEY

NUMBER OF DESTINATIONS 0

2009/04/13 12:34
MEMORY RESIDUAL CAPACITY 100%
Y M C K

JOB DISPLAY
SETTING CONFIRMATION
DOCUMENT DETAILS
PRINT EXECUTION
OTHERS
DELETE
CLEAR ALL
SELECT ALL

SYSTEM

| NO. | FILE NAME | STORAGE FOLDER | NUMBER OF DOCUMENTS | IMPORTANT DOCUMENT |
|---|---|---|---|---|
| 1 | Aaa.pdf | BUSINESS | 12 | ○ |
| 2 | Test.pdf | TEST | 5 | |

DEVICE, METHOD, AND PROGRAM FOR INSTRUCTING PRINTING BASED ON CONDITIONAL POST-PROCESSING

The entire disclosure of Japanese patent Application No. 2017-122037, filed on Jun. 22, 2017, is incorporated herein by reference in its entirety.

BACKGROUND

Technological Field

The present invention relates to a print instruction device, a print instruction method, and a print instruction program of an information processing apparatus or an image forming apparatus, the print instruction device being capable of issuing a print instruction to the image forming apparatus.

Description of the Related Art

Image forming apparatuses capable of performing both first connection processing of connecting recording media with a connection tool, such as stapling with staples, and second connection processing of connecting recording media without a connection tool, such as stapleless stapling, as post-processing after printing, have been provided By the way, putting documents printed with setting of the stapling with staples through a shredder may become a cause of malfunction. Meanwhile, documents with high confidentiality such as confidential documents and documents with high importance require waste disposal by a shredder as final processing.

For this reason, if the printing and post-processing are performed with setting of stapleless stapling processing from the beginning for the documents with high confidentiality and the documents with high importance, convenience is improved.

However, in the case where the stapling with staples is set by default, a user forgets to change the setting and printing is often performed despite the user recognizes that the printing is for documents to be disposed by a shredder. In this case, time and effort is required to remove the connection tool such as the staples from the documents before the documents are put through the shredder. Further, in the case where the user does not recognize that the printing is for documents to be disposed by a shredder, the documents are printed with the setting of stapling with staples, and the time and effort is required to remove the staples from the documents before the documents are put through the shredder.

Note that JP 2016-26971 A proposes a technology to automatically switch binding processing by either a stapleless binding unit or a staple binding unit depending on the number of sheets to be bound as a bundle in a sheet processing apparatus in which both the stapleless binding unit and the staple binding unit are mounted.

Further, JP 2015-89845 A proposes a sheet binding processing apparatus that performs binding processing of the first sheet material bundle with a staple stapler, and performs binding processing of the second and subsequent sheet material bundles with either an eco stapler or the staple stapler depending on the number of sheet materials of the sheet material bundle.

Further, JP 2013-170066 A proposes a printing apparatus that performs binding processing of binding a plurality of printed sheets without using staples in the case of performing test printing of image data, and performs binding processing of binding the printed plurality of sheets using staples in the case of printing the image data again after test printing by a printer.

However, the technologies described in JP 2016-26971 A, JP 2015-89845 A, and JP 2013-170066 A, the stapling with staple processing and the stapleless stapling processing are switched depending on the number of printings or depending on the first bundle or the second and subsequent bundles. Therefore, even if the document to be printed is a document with high importance or a document with high confidentiality, which is disposed by a shredder after printing, the stapling with staple processing is performed in the case where the number of printings is small or in the case where printing is for the second or subsequent bundle. Therefore, the technologies described in JP 2016-26971 A, JP 2015-89845 A, and JP 2013-170066 A do not provide a solution to solve the problem of requiring time and effort to remove staples from documents after printing.

SUMMARY

The present invention has been made in view of the technical background, and an object is to provide a print instruction device, a print instruction method, and a print instruction program, for prompting a user to set second connection processing without using a connection tool, such as stapleless stapling processing, as connection processing by a post-processor, when there is a high possibility of disposal of a document to be printed by a shredder or the like after printing because the document to be printed is a document with high confidentiality or a document with high importance.

To achieve the abovementioned object, according to an aspect of the present invention, there is provided a print instruction device, reflecting one aspect of the present invention, that issues a print instruction with first connection processing or second connection processing to an image forming apparatus including a printer that prints a document to be printed, and a post-processor capable of performing both the first connection processing and the second connection processing, the first connection processing being for connecting a printed matter with a connection tool, and the second connection processing being for connecting a printed matter without the connection tool, after printing on a plurality of recording media by the printer, wherein the print instruction device comprises: a display; and a hardware processor that: determines whether the document to be printed of which the printed matter is to be connected by the post-processor falls under a preset condition to perform the second connection processing; and displays, on the display, display prompting setting the second connection processing as connection processing after or before print setting with the first connection processing is performed, when the document to be printed is determined to fall under the preset condition to perform the second connection processing by the hardware processor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 9 is a diagram illustrating a list of documents stored in a confidential reception box in the image forming apparatus;

FIG. 11 is a table illustrating a list of image data stored in the image forming apparatus.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
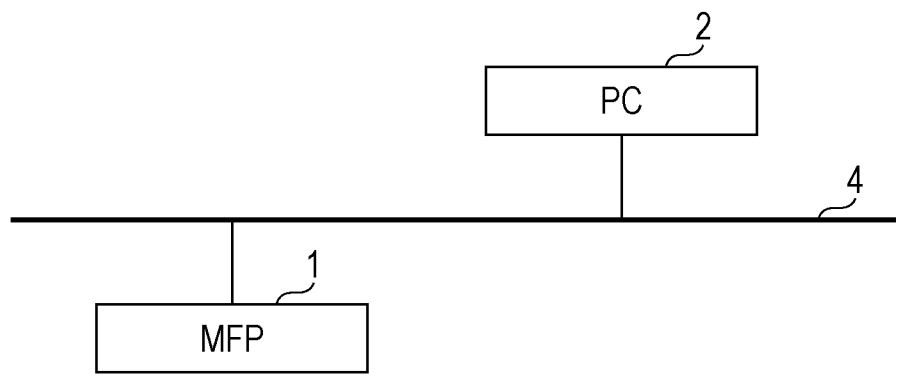
FIG. 1 is a diagram illustrating a configuration of a printing system in which a print instruction device according to an embodiment of the present invention is used.

FIG. 1 is a diagram illustrating a configuration of a printing system in which a print instruction device according to an embodiment of the present invention is used.

This printing system includes an image forming apparatus 1 in which a print instruction device according to an embodiment of the present invention is mounted and an information processing apparatus 2 in which the print instruction device according to an embodiment of the present invention is mourned, and the image forming apparatus 1 and the information processing apparatus 2 are connected with each other via a network 4.

In the present embodiment, a multi function peripheral (MFP) that is a multifunctional digital image forming apparatus having functions such as a copy function, a printer function, a scan function, and a facsimile function is used as the image forming apparatus 1. In the following description, the image forming apparatus is also referred to as an MFP. Further, in the present embodiment, the information processing apparatus 2 is a terminal device used by a user, and is configured by a personal computer. Hereinafter, the information processing apparatus is also referred to as a PC.

Figure 2:
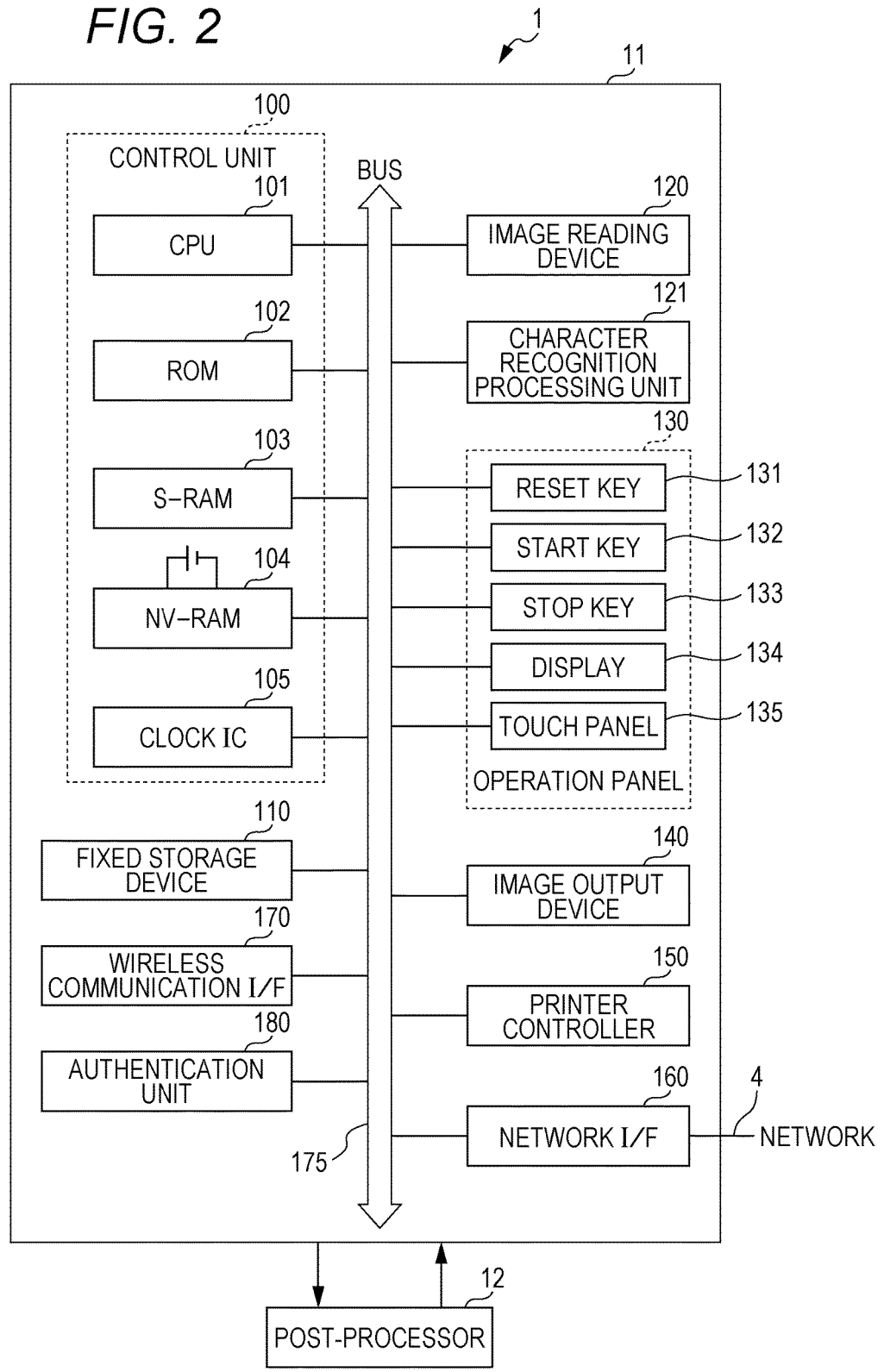
FIG. 2 is a block diagram illustrating a configuration of an image forming apparatus.

FIG. 2 is a block diagram illustrating a configuration of the MFP 1. As illustrated in FIG. 2, the MFP 1 includes a main device 11 and a post-processor 12.

The main device 11 includes a control unit 100, a fixed storage device 110, an image reading device 120, a character recognition processing unit 121, an operation panel 130, an image output device 140, a printer controller 150, a network interface (network I/F) 160, a wireless communication interface (wireless communication I/F) 170, an authentication unit 180, and the like, and the aforementioned units and devices are connected with one another via a system bus 175.

The control unit 100 includes a central processing unit (CPU) 101, a read only memory (ROM) 102, a static random access memory (S-RAM) 103, a non volatile RAM (NV-RAM) 104, a clock IC 105, and the like.

The CPU 101 comprehensively controls the entire MFP 1 by executing an operation program stored in the ROM 102 or the like. For example, the CPU 101 controls the copy function, the printer function, the scan function, the facsimile function, and the like in an executable manner. Furthermore, in the present embodiment, the CPU 101 determines whether a document to be printed falls under a preset condition to perform stapleless stapling processing when print setting with stapling processing by the post-processor 12 has been performed, and controls display of a display 134 according to a determination result. Details will be described below.

The ROM 102 stores programs executed by the CPU 101 and other data.

The S-RAM 103 serves as a work area when the CPU 101 executes a program, and temporarily stores the program, and data and the like used when executing the program.

The NV-RAM 104 is a nonvolatile memory backed up by a battery, and stores various settings related to image formation, and the like.

The clock IC 105 clocks time and functions as an internal timer and measures a processing time and the like.

The fixed storage device 110 includes a hard disk and the like, and stores programs, various data, and the like. Particularly, in the present embodiment, the preset condition for determining whether the stapleless stapling processing should be performed for the document to be printed, and the like are stored.

The image reading device 120 includes a scanner and the like, and reads a document set on a platen glass by scanning the document, and converts the read document into image data.

The character recognition processing unit 121 executes character recognition processing for the image data of the document read by the image reading device 120, and determines whether a predetermined character string is included under control of the CPU 101.

The operation panel 130 is used by the user to instruct a job to the MFP 1 and to perform various settings to the MFP 1, and includes a reset key 131, a start key 132, a stop key 133, the display 134, a touch panel 135, and the like.

The reset key 131 is used to reset the setting. The start key 132 is used for a start operation of scanning or the like. The stop key 133 is pressed to stop an operation or the like.

The display 134 include, for example, a liquid crystal display device, and displays messages, various operation screens, and the like. The touch panel 135 is formed on a screen of the display 134 and detects a touch operation by the user.

The image output device 140 prints the image data of the document read by the image reading device 120 or a copy image generated from print data transmitted from the PC 2 on a sheet and outputs the printed sheet as a printed matter.

The printer controller 150 generates a copy image from print data received by the network interface 160.

The network I/F 160 functions as a communication unit that transmits and receives data to and from an external device such as the server 2 via the network 4. The wireless communication I/F 170 is an interface that communicates with the external device by short-distance wireless communication.

The authentication unit 180 acquires authentication information of the user who logs in and compares the authentication information with information for comparison stored in advance in the fixed storage device 110 or the like to perform authentication. Note that the comparison between the authentication information of the user and the information for comparison may be performed by an external authentication server, and the authentication unit 180 may perform the authentication by receiving an authentication result from the authentication server.

The post-processor 12 performs post-processing for a plurality of printed matters (recording media) output after printing by the main device 11. The post-processing includes stapling processing of connecting the printed matters at a predetermined position, punching processing of forming a punch hole in a predetermined position of the printed matters, and the like. In the present embodiment, as the stapling processing, stapling with staple processing (first connection processing) of connecting the printed matters using staples as a connection tool, and stapleless stapling processing (second connection processing) of connecting the printed matters without using staples can be carried out.

Figure 3:
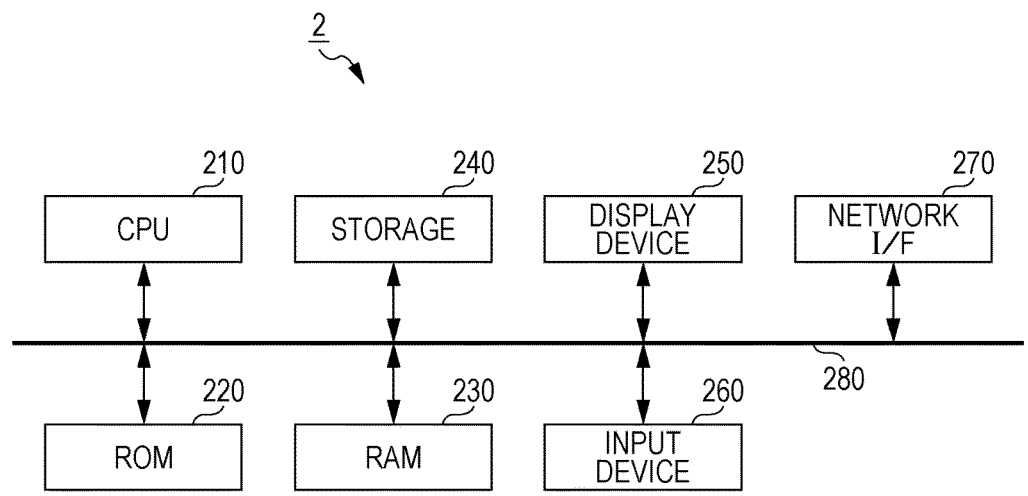
FIG. 3 is a block diagram illustrating a configuration of an information processing apparatus.

FIG. 3 is a block diagram illustrating an electrical configuration of the PC 2. The PC 2 includes a CPU 210, a ROM 220, a RAM 230, a storage 240, a display device 250, an input device 260, a network interface (network I/F) 270, and the like, and the aforementioned units and devices are connected with one another via a system bus 280.

The CPU 210 loads programs stored in the ROM 220, the storage 240, and the like into the RAM 230 and executes the programs, thereby comprehensively controlling the entire PC 2. In particular, in the present embodiment, the CPU 210 performs processing of determining whether an attribute of the document to be printed falls under the preset condition to perform the stapleless stapling processing when printing in the MIT 1 has been instructed by the user, and the like. Details will be described below.

The ROM 220 is a storage medium that stores programs to be executed by the CPU 210 and other data.

The RAM 230 is a storage medium that provides a work area, when the CPU 210 operates according to an operation program.

The storage 240 includes a storage medium such as a hard disk, and stores various management data, applications and the like. In the present embodiment, the preset condition for determining whether the stapleless stapling processing should be performed for the document to be printed, and the like are stored.

The display device 250 includes a liquid crystal display device or the like, and displays various messages, an input reception screen, a selection screen, and the like for the user.

The input device 260 is used for an input operation by the user, and includes a keyboard, a mouse, and the like.

The network interface 270 functions as a communication unit that transmits and receives data to and from the MFP 1 and the like via the network 4.

Figure 4:
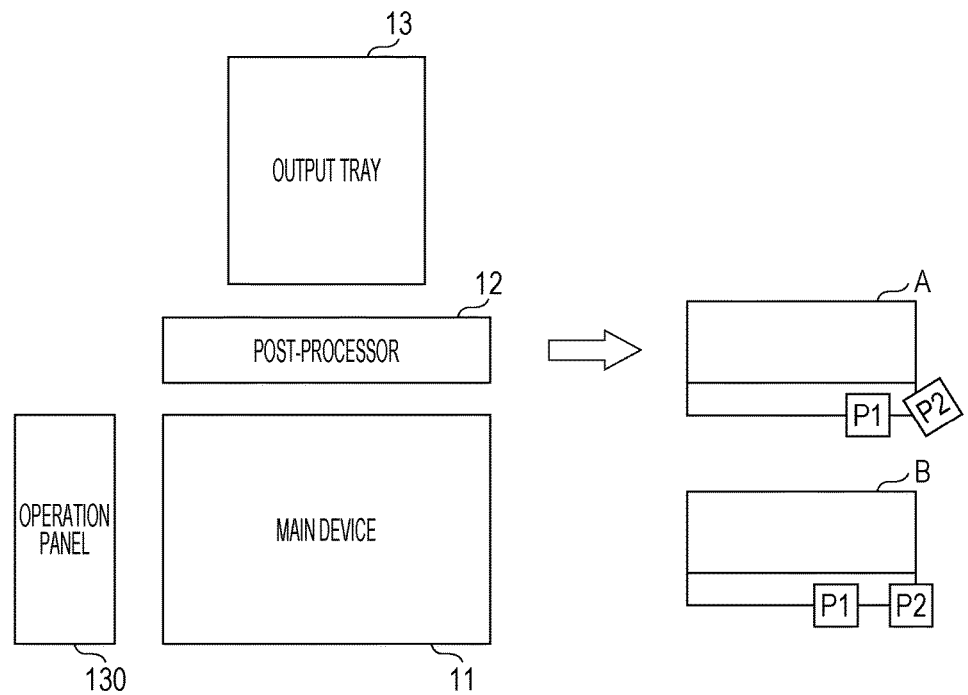
FIG. 4 is a diagram schematically illustrating a plan view of the image forming apparatus.

FIG. 4 schematically illustrates a plan view of the MFP 1. When the print setting for a print job (including a copy job) including the stapling processing by the post-processor 12 is performed through the operation panel 130 and the start key 132 is pressed, printing by the image output device 140 is performed on a recording medium fed from a paper feeder located under the main device 11, then the recording medium is conveyed to the post-processor 12, the stapling processing is performed by the post-processor 12, and then the recording medium is discharged onto an output tray 13.

The stapling processing by the post-processor 12 includes the stapling with staple processing by a staple binding mechanism P1 and the stapleless stapling processing by a stapleless binding mechanism P2. In the case where the print setting is the stapling with staple processing, the stapling, with staple processing is performed by the staple binding mechanism P1, as illustrated by A in FIG. 4. In the case where the print setting is the stapleless stapling processing, the stapleless binding mechanism P2 moves within the post-processor 12 and performs the stapleless stapling processing, as illustrated by B in FIG. 4.

In the present embodiment, whether the document to be printed falls under the preset condition to perform the stapleless stapling processing is determined. In the present embodiment, this condition is a condition for determining that the document to be printed is a document with high confidentiality such as a confidential document and/or a document with high importance. In the case of the document with high confidentiality and/or the document with high importance, the possibility of disposal of the document by a shredder or the like after printing is high. Therefore, in the case where the print setting including the stapling with staple processing has been made at the setting of the print job, display prowling setting of the stapleless stapling processing, to be specific, display prompting change of the stapling with staple processing to the stapleless stapling processing is performed.

Figure 5:
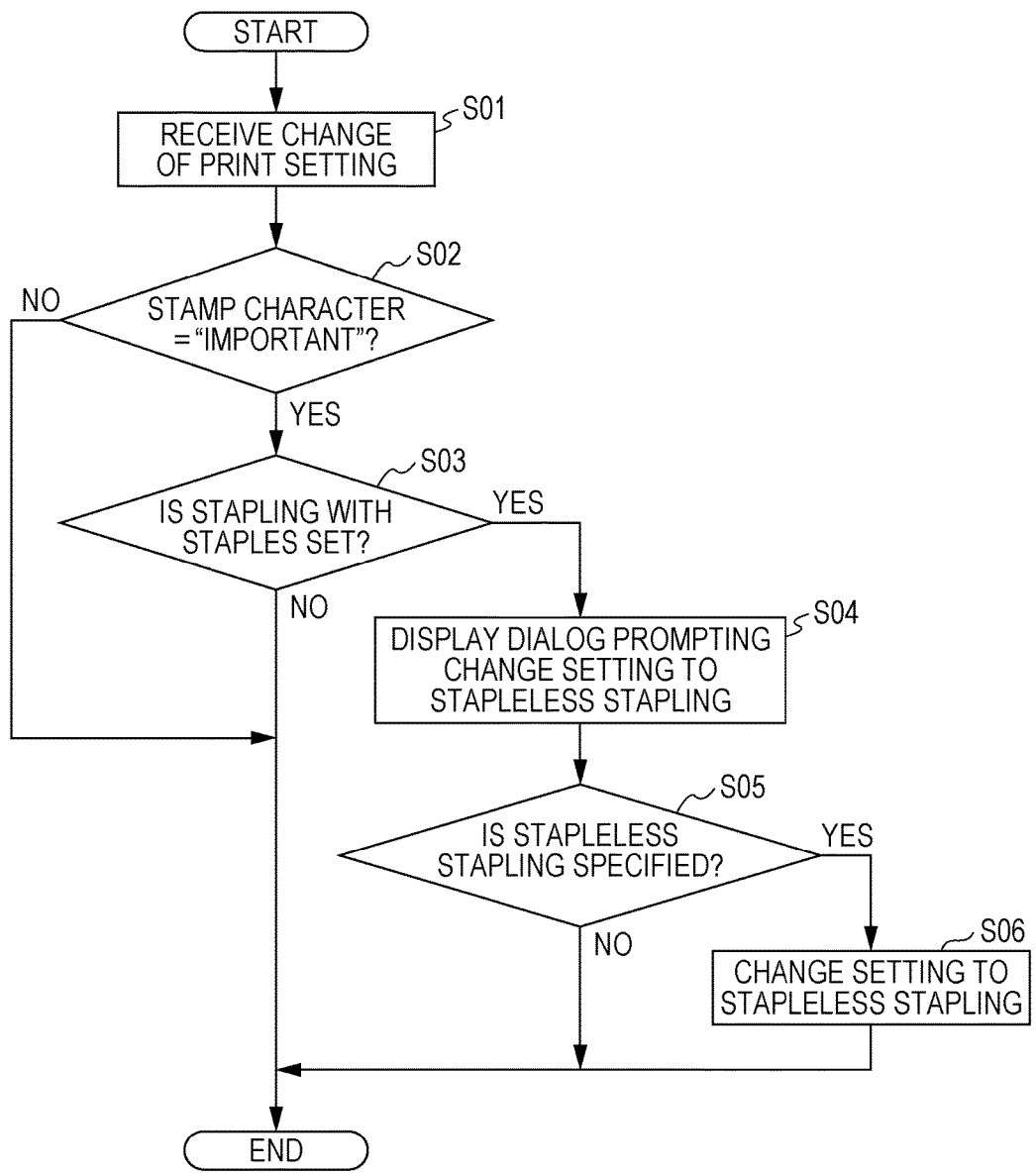
FIG. 5 is a diagram illustrating an example of a case of performing display prompting setting of stapleless stapling processing at the time of setting a print job.

FIG. 5 illustrates an example of a case of performing display prompting setting of the stapleless stapling processing at the time of setting a print job, and is a flowchart illustrating an operation performed in the PC 2 when the user specifies a document to be printed and performs print setting on the printer driver of the PC 2 and instructs the print job to the MFP 1. This operation is executed when the CPU 210 of the PC 2 operates according to a program of the printer driver or the like stored in the storage 240 or the like.

Figure 6:
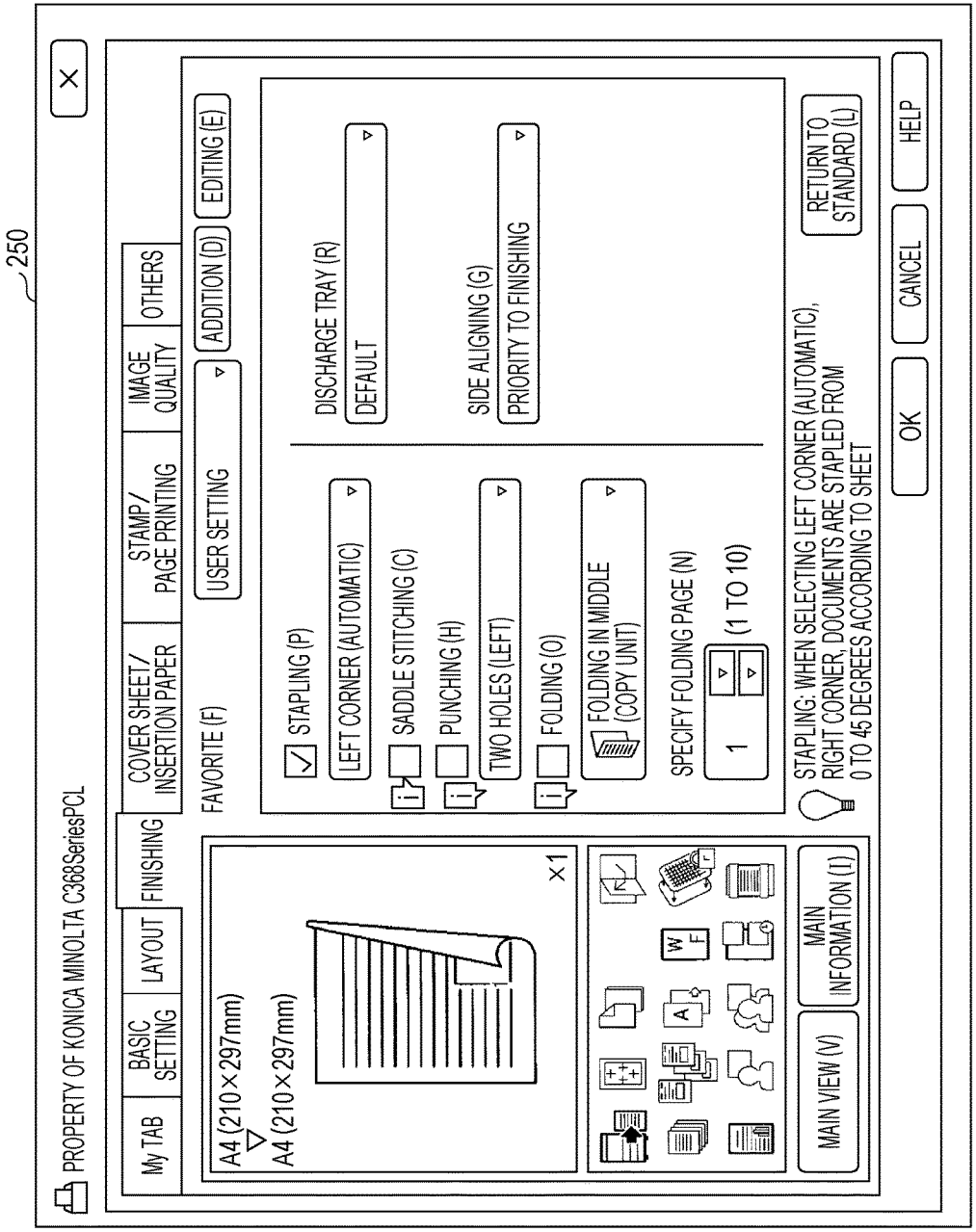
FIG. 6 is a diagram illustrating an example of a print setting screen of a printer driver in the information processing apparatus.
Figure 7:
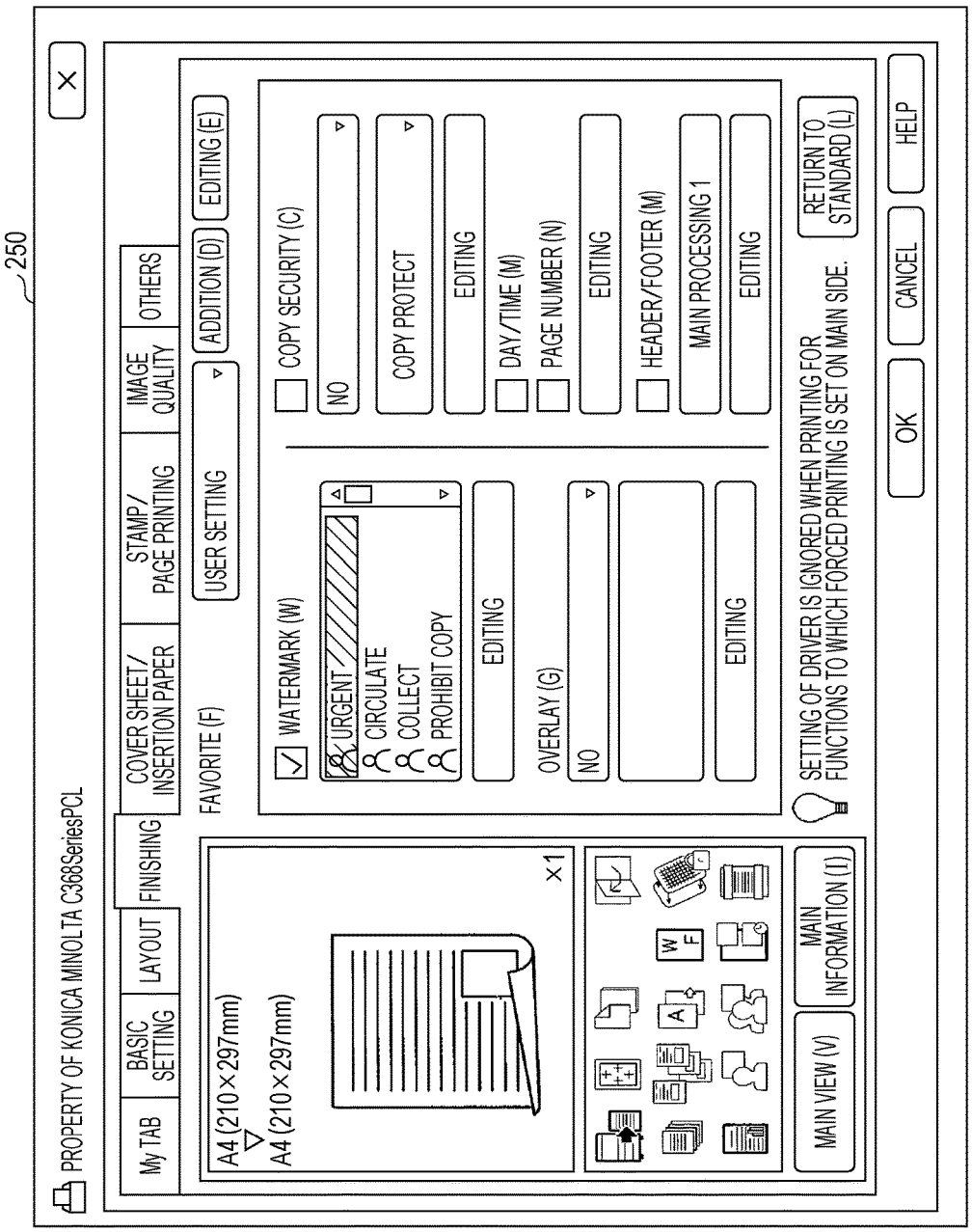
FIG. 7 is a diagram illustrating another example of the print setting screen of the printer driver in the information processing apparatus.

In step S01, change of the print setting by the user is received. For example, assuming that the user selects the stapling with staple processing as finishing setting after printing on a print setting screen of the printer driver illustrated in FIG. 6, and the user further checks an item "watermark" as stamp setting and selects "urgent" as a character string to be added to the printed matter, and presses an "OK" button on the print setting screen of the printer driver illustrated in FIG. 7.

In step S02 in FIG. 5, whether the character string added to the printed matter by the stamp setting is a character string indicating that the document to be printed is a document with high importance and/or with high confidentiality is determined. Examples of the character string indicating that the document to be printed is a document with high importance and/or with high confidentiality include "urgent", "top secret", "important", "be collected", and "attention".

When the character string to be added by the stamp setting is the character string indicating that the document to be printed is a document with high importance and/or with high confidentiality (YES in step S02), the document to be printed is determined to be the document with high confidentiality and/or the document with high importance, and whether the print setting of stapling with staples has been made is determined in step S03.

When the print setting with stapling with staples has not been made (NO in step S03), the present processing is terminated. In this case, the display prompting setting of the stapleless stapling processing is not performed, and an instruction of the print job is performed according to a normal procedure. Note that, in the case where the character string to be added by the stamp setting is not the preset character string in step S002 (NO in step S02), the processing is also terminated.

On the other hand, when the print setting of stapling with staples has been made in step S03 (YES in step S03), a dialog prompting change to the stapleless stapling is displayed on the display device 250 in step S04, and then the processing proceeds to step S05.

Figure 8:
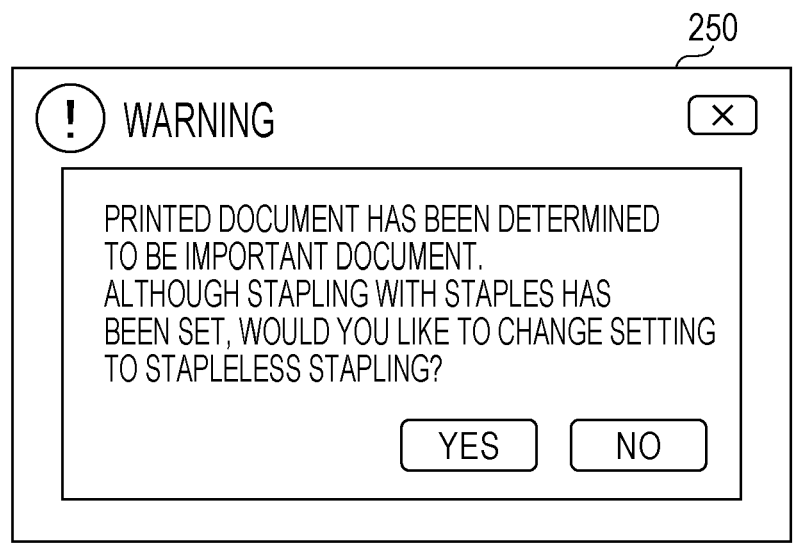
FIG. 8 is a diagram illustrating an example of a dialog prompting setting of stapleless stapling displayed on the information processing apparatus.

FIG. 8 illustrates an example of a dialog prompting change to the stapleless stapling displayed on the display device 250. On the screen, a message "the printed material has been determined to be an important document. Although the stapling with staples has been set, would you like to change the setting to the stapleless stapling?" and an "YES" button and a "NO" button are displayed.

Referring back to FIG. 5, in step SOS, whether the "YES" button on the screen in FIG. 8 has been pressed by the user is determined. When the "YES" button has been pressed (YES in step S05), the setting is changed to the stapleless stapling in step S06. When the "NO" button is pressed (NO in step S05), change to the stapleless stapling is not performed.

As described above, in the present embodiment, whether the document to be printed is the document with high importance and/or with high confidentiality is determined according to whether the document to be printed falls under the preset condition. When the document to be printed is determined to be the document with high importance and/or with high confidentiality, the display prompting setting of the stapleless stapling processing is displayed on the display device 250. Therefore, when there is a high possibility of disposal of the document to be printed by a shredder after printing, for example, because the document to be printed is the document with high importance and/or with high confidentiality, the user can prevent in advance connection of the printed matters by the stapling with staple processing. Therefore, troublesome work such as removal of the connection tool from the printed matters at the time of disposal becomes unnecessary and it is convenient.

In the embodiment illustrated in FIG. 5, when the user first performs setting of the stapling with staple processing and then performs the stamp setting to add the character string to the printed matter, whether the character string to be added corresponds to the preset character string indicating that the document to be printed is the document with high importance and/or with high confidentiality is determined, and the display prompting change of the setting of the stapling with staple processing to the stapleless stapling processing is performed when the character string to be added corresponds to the preset character string.

However, when the user performs the stamp setting before performing the setting of the stapling with staple processing, and the character string to be added by the stamp selling is determined to be the character string indicating that the document to be printed is the document with high importance and/or with high confidentiality, a dialog prompting setting of the stapleless stapling processing, such as "the stapleless stapling is recommended because the document is an important document", may be displayed when the stapling setting screen is displayed.

Further, whether a character string to be added by pattern setting instead of by the stamp setting corresponds to a preset character string indicating the document to be printed with high importance and/or high confidentiality, such as "urgent", "secret", "important", "be collected", or "attention", may be determined.

Further, Whether the document to be printed is a document for which print setting of copy protect setting and/or copy guard setting has been made is determined, instead, of determining the character string to be added to the document to be printed, and when the document to be printed is the document for which the print setting of copy protect setting and/or copy guard setting has been made, the document to be printed is determined to be the document with high importance and/or with high confidentiality, and setting of the stapleless stapling processing (including change to the stapleless stapling processing) may be prompted.

Further, whether printing to a predetermined specific type of recording medium (paper), such as a double-sided printing prohibited paper or an eco paper, has been instructed is determined, in addition to whether the character string to be added corresponds to the predetermined character string, or whether the print setting of copy protection setting and/or copy guard setting has been made. When the character string to be added corresponds to the predetermined character string, or the print setting of copy protect setting and/or copy guard setting has been made, and the printing to a predetermined specific type of recording medium has been instructed, the document to be printed is determined to be the document with high importance and/or with high confidentiality, and setting of the stapleless stapling processing may be prompted. When the document to be printed is the document with high importance and/or with high confidentiality, the document to be printed is often printed on the double-sided printing prohibited paper or the eco paper. Therefore, by adding the determination regarding the type of the recording medium to the condition, whether the document to be printed is the document with high importance and/or with high confidentiality can be more efficiently determined.

Further, in the embodiment described in FIG. 5, the print instruction has been made from the PC 2 to the MFP 1, and the display prompting setting of the stapleless stapling processing has been performed on the display device 250 of the PC 2. However, in the case of instructing printing (including copying) by an operation of the operation panel 130 of the MFP 1, the print setting to add the character string to the document to be printed by stamp 41) setting or pattern setting, and the print setting of copy protect setting and/or copy guard setting are performed. In the case of setting the stapling with staple processing, the CPU 101 of the MFP 1 operates according to the operation program stored in the ROM 102 or the like, thereby to determine whether the document to be printed (including a document to be copied) is the document with high importance and/or with high confidentiality, and when the document to be printed is the document with high importance or with high confidentiality, display prompting setting of the stapleless stapling processing (including change to the stapleless stapling processing) may be displayed on the display 134.

Further, even in the case of a print job from the PC 2, the display prompting setting of the stapleless stapling processing may be performed on the display 134 of the MFP 1.

Further, whether the document to be printed is the document with high importance and/or with high confidentiality may be determined according to whether the document to be printed is a document stored in a predetermined specific place.

For example, a specific box in which a document with high importance and/or with high confidentiality is stored is provided in a storage region called box in the fixed storage device 110 of the MFP 1, and a document read from the specific box may be determined to be the document with high importance and/or with high confidentiality.

FIG. 9 illustrates a list of documents stored in a confidential reception box in the fixed storage device 110, the list being displayed on the display 134 of the MFP 1. Since a confidentially received document is a document with high confidentiality, a predetermined document is selected from the list in FIG. 9 and the print job of the stapling with staple processing is set. When the start key 132 is pressed, the dialog prompting setting of the stapleless stapling processing, as illustrated in FIG. 8, may be displayed on the display 134.

Note that the same applies to the case of specifying a document in the confidential reception box of the MFP 1 illustrated in FIG. 9 and issuing a print instruction to the MFP 1 by the PC 2.

Further, the storage place of the document with high importance and/or with high confidentiality is not limited to the MFP 1, and may be the PC 2, another MFP, or a server.

Figure 10:
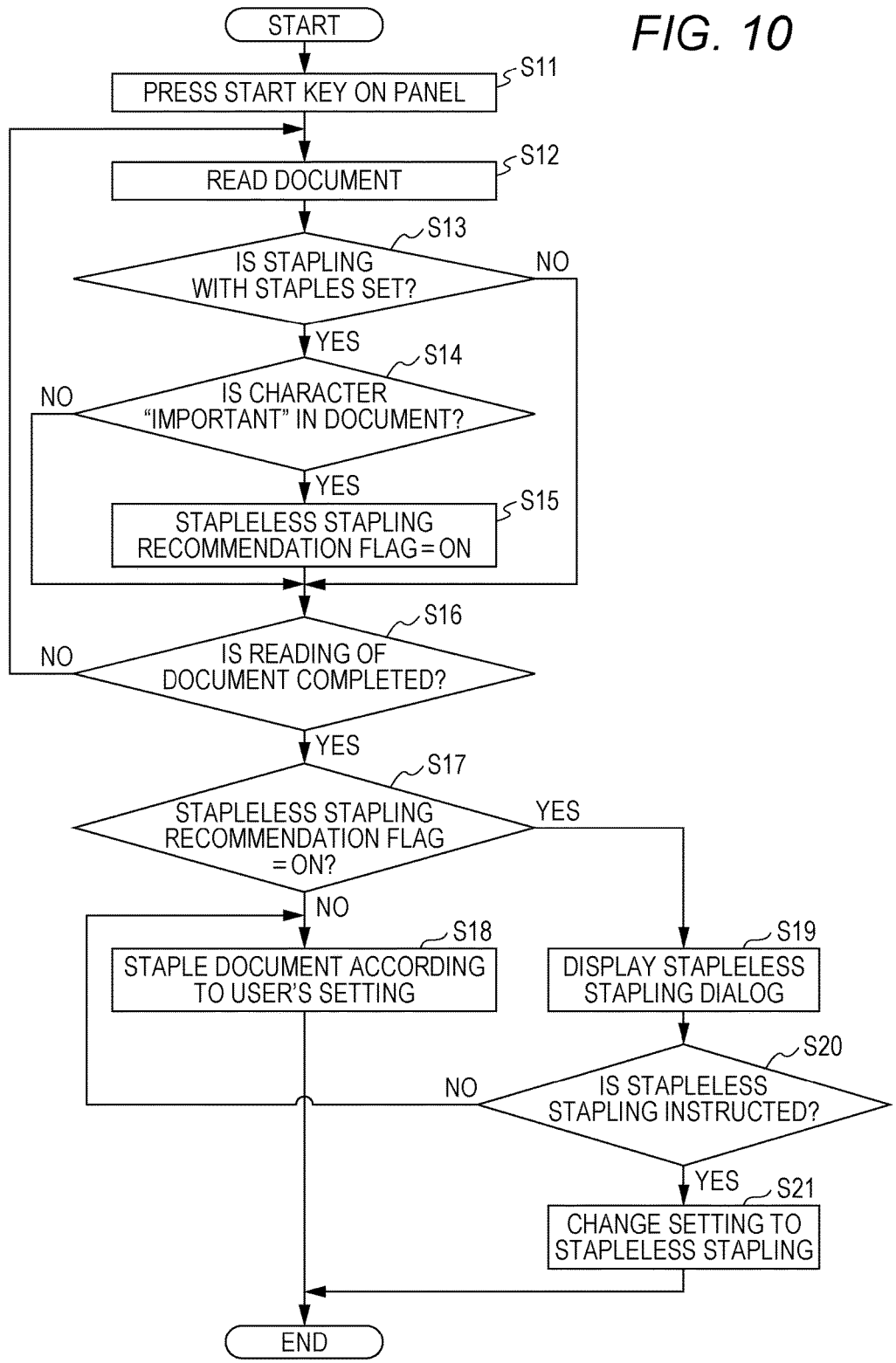
FIG. 10 is a flowchart illustrating another example of the case of performing display prompting setting of stapleless stapling processing at the time of setting a print job.

FIG. 10 is a flowchart illustrating another example of the case of performing display prompting selling of the stapleless stapling processing at the time of setting a print job. In this example, the character recognition processing is executed for image data of a document read in the image reading device 120 of the MFP 1, and when a preset character string such as "important" or "top secret" has been desirably extracted to a given place (for example, on an upper right on the document), the document is determined to be the document with high importance and/or the document with high confidentiality. Note that the operation illustrated in the flowchart in FIG. 10 is executed when the CPU 101 of the MFP 1 operates according to the operation program stored in the ROM 102 or the like.

When the start key 132 of the operation panel 130 is pressed in step S11, reading of a document (document to be printed) by the document reading device 120 is started in step S12. Next, in step S13, whether the stapling with staple processing has been set is determined. When the processing has not been set (NO in step S13), the processing proceeds to step S16. When the processing has been set (YES in step S13), the character recognition processing for the image data of the read document is performed in step S14, and whether the preset character string such as "important" or "top secret" has been extracted to a predetermined place is determined. When the character string has not been extracted (NO in step S14), the processing proceeds to step S16. When the character string has been extracted (YES in step S14), a stapleless stapling recommendation flag is turned on in step S15, and then the processing proceeds to step S16.

In step S16, whether the reading of the document has been completed is determined. When the reading has not been completed (NO in step S16), the processing returns to step S12. When the reading of the document has been completed (YES in step S16), whether the stapleless stapling recommendation flag is ON is checked in step S17. When the stapleless stapling recommendation flag is not ON (NO in step S17), stapling processing according to user's setting is set in step S18.

When the stapleless stapling recommendation flag is ON in step S17 (YES in step S17), the dialog prompting change to the stapleless stapling as illustrated in FIG. 8 is displayed on the display 134 in step S19. Next, in step S20, whether the change to the stapleless stapling processing has been instructed by pressing of the "YES" button is determined. When the change to the stapleless stapling processing has not been instructed (NO in step S20), the processing proceeds to step S18, and stapling processing according to user's setting is set. When the change to the stapleless stapling processing has been instructed (YES in step S20), the setting is changed to the stapleless stapling processing in step S021.

In the embodiment illustrated in FIG. 10, the character recognition processing is performed for the image data of the document to be printed read in the image reading device 120, and the preset character string such as "important" or "top secret" is extracted, whereby the document to be printed is determined to be the document with high importance and/or with high confidentiality. Therefore, whether the document to be printed is the document with high importance and/or with high confidentiality can be determined with high accuracy.

Note that the character recognition processing for the image data may be performed only for a first page or for all the pages. In the case of executing the character recognition processing for all the pages, and when the preset character string such as "important" or "top secret" has been extracted in a middle page, the document to be printed can be determined to be the document with high importance and/or with high confidentiality, and thus it is better not to execute the character recognition processing for subsequent pages. As a result, subsequent character recognition processing becomes unnecessary, and the time for the document reading processing can be shortened.

Further, start of printing may be performed after the document reading and the character recognition processing are completed for all the pages, or printing may be sequentially performed on pages for which the document reading and character recognition processing are completed and printed matters are held in an unprocessed state of the stapling processing, and the stapling processing may be performed after completion of the printing.

Further, in the case of storing the image data of the document read by the image reading device 120 to the box or the like, it is better to store a result of the character recognition processing as to whether the preset character string, such as "important" or "top secret" has been extracted, that is, the information indicating that the document is the document with high importance and/or with high confidentiality in association with the image data (document) to be stored.

FIG. 11 is a table illustrating a list of stored image data. The example of FIG. 11 illustrates a state in which a document with a file name "Aaa.pdf" is stored in association with information indicating that the document is an important document. Then, in the case of calling and printing the document to which the information indicating an important document has been added, whether the document is the document with high importance and/or with high confidentiality can be easily and reliably determined on the basis of the added information. In the case of collectively printing a plurality of documents, if the information indicating an important document is added to any one of the documents, all of the plurality of documents may just be treated as the documents with high importance and/or with high confidentiality.

In the embodiment illustrated in FIG. 10, the character recognition processing has been executed for the image data read by the image reading device 120 of the MFP 1 and the preset character string has been extracted. However, in the case of instructing printing of a document to be printed in a specific format, such as a format directly printable on the MFP 1 side and in which line feed or a chapter in the document can be discriminated, such as Excel or Word, from the operation panel 130 of the MFP 1, the MFP 1 may once parse all the documents to be printed then perform the printing operation in the case where the stapling with staple processing has been set. Note that office files can be described in OOXML (Office Open XML), and parsing is possible by analyzing the content of OOXML files.

Then, as a result of the parsing, when the character string such as "important", which is the preset condition, is set to have a predetermined size (for example, 14 points) or more, or setting to print the character string in a specific color (for example, red) has been made, a message prompting setting of the stapleless stapling processing may be displayed on the display 134.

Further, in the above case, as a result of the parsing, a chapter falling under the preset condition is discriminated, and the stapleless stapling processing may be performed for only a page that includes the chapter and the stapling with staple processing may be performed for the other pages.

Although an embodiment of the present invention has been described and illustrated in detail, the disclosed embodiments are made for purposes of illustration and example only and the present invention is not limited to the above-described embodiment. The scope of the present invention should be interpreted by terms of the appended claims. For example, in the case where the number of printings exceeds an upper limit value of a possible number of the stapleless stapling processing by the post-processor 12, the stapleless stapling processing may be performed for pages up to a page that reaches the upper limit value of the possible number, and the stapling with staple processing may be performed for pages exceeding the upper limit value.

What is claimed is:

1. A print instruction device that issues a print instruction with first connection processing or second connection processing to an image forming apparatus including a printer that prints a document to be printed, and a post-processor capable of performing both the first connection processing and the second connection processing, the first connection processing being for connecting a printed matter with a connection tool, and the second connection processing being for connecting a printed matter without the connection tool, after printing on a plurality of recording media by the printer, the print instruction device comprising:
    a display; and
    a hardware processor that:
        determines whether the document to be printed of which the printed matter is to be connected by the post-processor falls under a preset condition to perform the second connection processing, wherein the preset condition to perform the second connection processing is a condition for determining whether the document to be printed is a document with high importance and/or a document with high confidentiality; and
        displays, on the display, display prompting setting the second connection processing as connection processing after or before print setting with the first connection processing is performed, when the document to be printed is determined to fall under the preset condition to perform the second connection processing by the hardware processor.

2. The print instruction device according to claim 1, wherein the preset condition is that print setting of copy protect setting and/or copy guard setting to the document to be printed has been made.

3. The print instruction device according to claim 1, wherein the print instruction device is included in the image forming apparatus, and the image forming apparatus includes a document reader, and the hardware processor that recognizes a character string from image data of the document to be printed read by the document reader, and the preset condition is that a predetermined specific character string has been extracted by the hardware processor.

4. The print instruction device according to claim 3, wherein, when the predetermined specific character string has been extracted by the hardware processor, subsequent character recognition processing is not performed.

5. The print instruction device according to claim 1, wherein:
    the print instruction device is included in the image forming apparatus, and the image forming apparatus includes a document reader, the hardware processor that recognizes a character string from image data of the document to be printed read by the document reader, and a storage that stores the image data together with information when the predetermined specific character string has been extracted by the hardware processor, the information indicating the extraction of the predetermined specific character string, and
    the preset condition is that the document to be printed is the document data stored together with the information in the storage.

6. The print instruction device according to claim 1, wherein, when setting to the second connection processing has been instructed to the display prompting setting the second connection processing in a case where the number of printings by the printer exceeds an upper limit value of the number of printings for which the second connection processing is possible, the post-processor divides the printed matter into a plurality of printed matters and performs the second connection processing.

7. The print instruction device according to claim 1, wherein:
    the hardware processor is capable of discriminating a chapter falling under the preset condition in the document to be printed, and
    when setting to the second connection processing has been instructed to the display prompting setting to the second connection processing, the post-processor performs the second connection processing for a page that includes the chapter falling under the preset condition, the chapter having been discriminated by the hardware processor, and performs the first connection processing for another page.

8. The print instruction device according to claim 1, wherein the setting is changed to stapleless stapling by input from a user after the display.

9. A print instruction device that issues a print instruction with first connection processing or second connection processing to an image forming apparatus including a printer that prints a document to be printed, and a post-processor capable of performing both the first connection processing and the second connection processing, the first connection processing being for connecting a printed matter with a connection tool, and the second connection processing being for connecting a printed matter without the connection tool, after printing on a plurality of recording media by the printer, the print instruction device comprising:
    a display; and
    a hardware processor that:
        determines whether the document to be printed of which the printed matter is to be connected by the post-processor falls under a preset condition to perform the second connection processing, wherein the preset condition is that print setting to add a stamp and/or a pattern to the document to be printed has been made, and a character string of the stamp and/or the pattern to be added is a predetermined character string; and displays, on the display, display prompting setting the second connection processing as connection processing after or before print setting with the first connection processing is performed, when the document to be printed is determined to fall under the preset condition to perform the second connection processing by the hardware processor.

10. The print instruction device according to claim 9, wherein the preset condition is that the recording medium on which the document to be printed is printed is a predetermined specific type of recording medium.

11. A print instruction device that issues a print instruction with first connection processing or second connection processing to an image forming apparatus including a printer that prints a document to be printed, and a post-processor capable of performing both the first connection processing and the second connection processing, the first connection processing being for connecting a printed matter with a connection tool, and the second connection processing being for connecting a printed matter without the connection tool, after printing on a plurality of recording media by the printer, the print instruction device comprising:

a display; and a hardware processor that:

determines whether the document to be printed of which the printed matter is to be connected by the post-processor falls under a preset condition to perform the second connection processing, wherein the preset condition is that the document to be printed is a document stored in a predetermined specific place; and displays, on the display, display prompting setting the second connection processing as connection processing after or before print setting with the first connection processing is performed, when the document to be printed is determined to fall under the preset condition to perform the second connection processing by the hardware processor.

12. A print instruction method executed by a print instruction device that includes a display and issues a print instruction with first connection processing or second connection processing to an image forming apparatus including a printer that prints a document to be printed, and a post-processor capable of performing both the first connection processing and the second connection processing, the first connection processing being for connecting a printed matter with a connection tool, and the second connection processing being for connecting a printed matter without the connection tool, after printing on a plurality of recording media by the printer, the print instruction device executing:

determining whether the document to be printed of which the printed matter is to be connected by the post-processor falls under a preset condition to perform the second connection processing, wherein the preset condition to perform the second connection processing is a condition for determining whether the document to be printed is a document with high importance and/or a document with high confidentiality; and displaying, on the display, display prompting setting the second connection processing as connection processing after or before print setting with the first connection processing is performed, when the document to be printed is determined to fall under the preset condition to perform the second connection processing by the determining.

13. A non-transitory recording medium storing a computer readable print instruction program for causing a computer of a print instruction device that includes a display and issues a print instruction with first connection processing or second connection processing to an image forming apparatus including a printer that prints a document to be printed, and a post-processor capable of performing both the first connection processing and the second connection processing, the first connection processing being for connecting a printed matter with a connection tool, and the second connection processing being for connecting a printed matter without the connection tool, after printing on a plurality of recording media by the printer, to execute:

determining whether the document to be printed of which the printed matter is to be connected by the post-processor falls under a preset condition to perform the second connection processing, wherein the preset condition to perform the second connection processing is a condition for determining whether the document to be printed is a document with high importance and/or a document with high confidentiality; and displaying, on the display, display prompting setting the second connection processing as connection processing after or before print setting with the first connection processing is performed, when the document to be printed is determined to fall under the preset condition to perform the second connection processing by the determining.

\* \* \* \* \*